United States Patent
Liu et al.

(10) Patent No.: US 12,529,634 B2
(45) Date of Patent: Jan. 20, 2026

(54) FOLD TESTING DEVICE

(71) Applicant: KUNSHAN GO-VISIONOX OPTO-ELECTRONICS CO., LTD., Kunshan (CN)

(72) Inventors: Suwei Liu, Kunshan (CN); Shuo Yang, Kunshan (CN); Yaoyan Wu, Kunshan (CN); Chunxiao Gu, Kunshan (CN); Bin Yang, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 267 days.

(21) Appl. No.: 17/969,497

(22) Filed: Oct. 19, 2022

(65) Prior Publication Data
US 2023/0037877 A1 Feb. 9, 2023

Related U.S. Application Data

(63) Continuation of application No. PCT/CN2021/095759, filed on May 25, 2021.

(30) Foreign Application Priority Data

Aug. 27, 2020 (CN) .......................... 202010877303.7

(51) Int. Cl.
*G01N 3/20* (2006.01)
*G09F 9/30* (2006.01)

(52) U.S. Cl.
CPC ....... *G01N 3/20* (2013.01); *G01N 2203/0023* (2013.01); *G01N 2203/0282* (2013.01); *G09F 9/301* (2013.01)

(58) Field of Classification Search
CPC ............. G01N 3/20; G01N 2203/0023; G01N 2203/0282; G09F 9/301; G01M 11/02; G01M 11/0214
(Continued)

(56) References Cited

U.S. PATENT DOCUMENTS

2015/0378391 A1* 12/2015 Huitema ................ H05K 1/183
361/679.03
2016/0086527 A1 3/2016 Kim et al.
(Continued)

FOREIGN PATENT DOCUMENTS

CN 203409677 U 1/2014
CN 106596078 A 4/2017
(Continued)

OTHER PUBLICATIONS

International Search Report and Written Opinion (International Application No. PCT/CN2021/095759) with English Translation, dated Jul. 20, 2021, 17 pages.
(Continued)

*Primary Examiner* — Robert R Raevis
(74) *Attorney, Agent, or Firm* — Quarles & Brady LLP

(57) ABSTRACT

A fold testing device, including a support mechanism, an adjusting mechanism, and an attaching mechanism. The support mechanism includes a supporting body, a first position limiting part, and a second position limiting part. The first position limiting part and the second position limiting part are arranged on a side of the supporting body along a first direction. The supporting body, the first position limiting part and the second position limiting part are enclosed to form a positioning part. A flexible display module is received in the positioning part. The adjusting mechanism is installed on the supporting body, and configured to drive at least one of the first position limiting part and the second position limiting part to move along the first direction. The attaching mechanism includes an elastic attaching body. The elastic attaching body is movable toward the supporting body along a second direction. The elastic attaching body engages with the positioning part.

17 Claims, 4 Drawing Sheets

(58) Field of Classification Search
USPC .... 324/537, 750.16, 750.19, 750.22, 750.25; 73/159, 849, 851, 852, 865.9
See application file for complete search history.

(56) References Cited

U.S. PATENT DOCUMENTS

| | | |
|---|---|---|
| 2019/0154555 A1 | 5/2019 | Han et al. |
| 2019/0299369 A1 | 10/2019 | Lee et al. |
| 2022/0163433 A1 | 5/2022 | Ma et al. |

FOREIGN PATENT DOCUMENTS

| | | | |
|---|---|---|---|
| CN | 206550912 U | | 10/2017 |
| CN | 107588925 A | | 1/2018 |
| CN | 107631861 | * | 1/2018 |
| CN | 107631861 A | | 1/2018 |
| CN | 108581868 A | | 9/2018 |
| CN | 108692923 A | | 10/2018 |
| CN | 208084213 U | | 11/2018 |
| CN | 109532193 A | | 3/2019 |
| CN | 208872495 U | | 5/2019 |
| CN | 110095338 A | | 8/2019 |
| CN | 209231190 U | | 8/2019 |
| CN | 209416663 U | | 9/2019 |
| CN | 110930882 A | | 3/2020 |
| CN | 111122131 A | | 5/2020 |
| CN | 111554191 A | | 8/2020 |
| CN | 112098051 A | | 12/2020 |
| KR | 20140001304 A | | 1/2014 |
| KR | 102055445 B1 | | 12/2019 |

OTHER PUBLICATIONS

Chinese First Office Action 100191 (CN Application No. 202010877303.7) and Search Result with English Translation, dated Jan. 21, 2021, 24 pages.

Chinese Second Office Action 100191 (CN Application No. 202010877303.7) with English Translation, dated Aug. 3, 2022, 19 pages.

* cited by examiner

FOLD TESTING DEVICE

CROSS-REFERENCE TO RELATED APPLICATION

This application is a continuation application of international patent application PCT/CN2021/095759, filed on May 25, 2021, which claims the benefit of Chinese Patent Application No. 202010877303.7, filed on Aug. 27, 2020. The contents of both applications are also hereby incorporated by reference in their entireties.

TECHNICAL FIELD

The present disclosure relates to the field of display technologies, and more particularly relates to a fold testing device.

BACKGROUND

The development of flexible display technology has promoted continuous innovation of the design of consumable electronic products. Due to its beautiful appearance, an electronic product with a curved surface can display or be touched via the front and the side surfaces. The curved surface attaching technology has gradually developed from right angle attaching to four-curved surface attaching. The four-curved surface attaching is more favored by consumers because of its higher space utilization rate and better operation performance.

SUMMARY

Based on this, the present application provides a fold testing device, which can form flexible display modules with different fold rates, and thus facilitate testing influences of folds on display effect of a screen and on reliability of the screen.

According to the present application, a fold testing device is provided and includes a support mechanism, an adjusting mechanism, and an attaching mechanism.

The support mechanism includes a supporting body, a first position limiting part, and a second position limiting part. The first position limiting part and the second position limiting part are oppositely arranged on a side of the supporting body along a first direction. The supporting body, the first position limiting part and the second position limiting part are enclosed to form a positioning part. A flexible display module is received in the positioning part.

The adjusting mechanism is installed on the supporting body, and configured to drive at least one of the first position limiting part and the second position limiting part to move along the first direction to make the first position limiting part and the second position limiting part close to or away from each other, to adjust a first size of a spacing between the first position limiting part and the second position limiting part.

The attaching mechanism includes an elastic attaching body. The elastic attaching body is movable toward the supporting body along a second direction. The elastic attaching body engages with the positioning part. The supporting body, the first position limiting part, the second position limiting part and the elastic attaching body define a limiting position. The flexible display module forms folds with a fold rate at the limiting position.

A first direction is defined as a direction of a straight line connected between a first center of the first position limiting part and a second center of the second position limiting part, and the second direction is perpendicular to a horizontal plane where the first direction is located.

In the fold testing device above, the flexible display modules with different fold rates are formed by adjusting the first size of the spacing between the first position limiting part and the second position limiting part via the adjusting mechanism, and by the engagement of the positioning part with the elastic attaching body. In this way, the display effect of the flexible display modules with different fold rates and the screen reliability can be tested according to subsequent experiments.

DETAILED DESCRIPTION

In order to make the present application better understood, the present application will be described more fully herein with reference to the attached drawings. The preferred embodiments of the present application are shown in the attached drawings. However, the present application may be implemented in many different forms but is not limited to the embodiments described herein. On the contrary, the purpose of providing these embodiments is to make the present disclosure to be understood thoroughly and completely.

At present, when the four-curved surface cover plate is attached to the flexible display module, the flexible display module tends to generate folds at the four corners of the four-curved surface cover plate.

Figure 1:
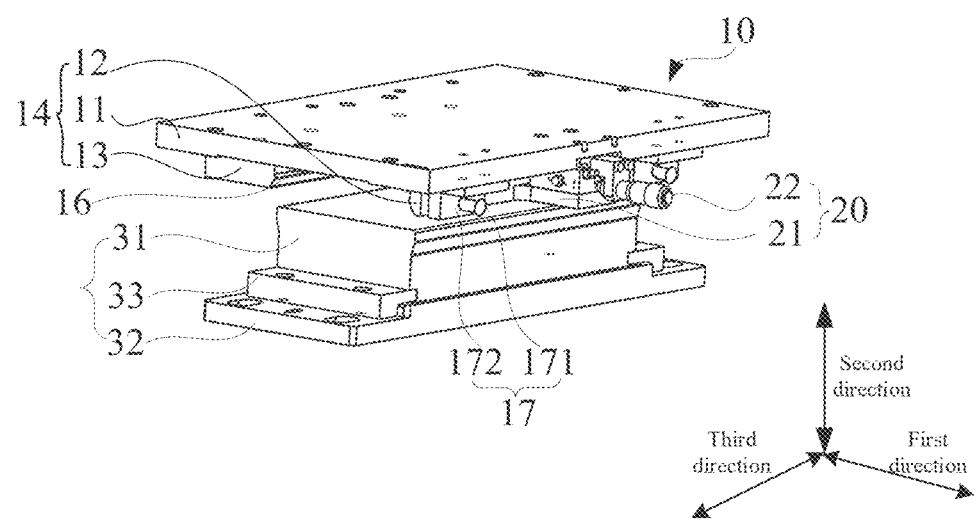
FIG. 1 is a three-dimensional structural view showing the fold testing device according to an embodiment of the present application.
Figure 2:
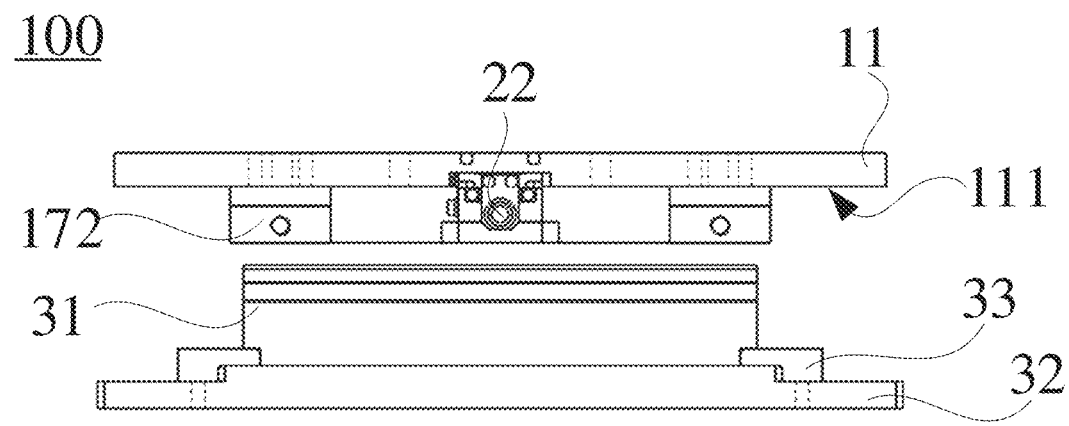
FIG. 2 is a schematic structural view showing the fold testing device in FIG. 1 from another angle.

Referring to FIG. 1 and FIG. 2, in an embodiment of the present application, the fold testing device 100 includes a support mechanism 10, an adjusting mechanism 20, and an attaching mechanism 30.

The support mechanism 10 includes a supporting body 11, a first position limiting part 12, and a second position limiting part 13. The first position limiting part 12 and the second position limiting part 13 are arranged opposite on the same side surface of the supporting body 11. Specifically, the supporting body 11 has a side surface functioning as a supporting surface 111, and the first position limiting part 12 and the second position limiting part 13 are arranged on the supporting surface 111. The supporting body 11, the first position limiting part 12, and the second position limiting part 13 are enclosed to form a positioning part 14. The flexible display module 200 is received in the positioning part 14.

The adjusting mechanism 20 is installed on the supporting body 11, and the adjusting mechanism 20 is configured to drive at least one of the first position limiting part 12 and the second position limiting part 13 to move along the first direction, so that the first position limiting part 12 and the second position limiting part 13 may be close to or away from each other, thereby adjusting a first dimension of a spacing between the first position limiting part 12 and the second position limiting part 13. In this embodiment, referring to FIG. 3 and FIG. 4, the adjusting mechanism 20 is configured to drive the first position limiting part 12 to move along the first direction, so that the first position limiting part 12 moves close to or away from the second position limiting part 13. In other embodiments, the adjusting mechanism 20 may drive the first position limiting part 12 and the second position limiting part 13 to move along the first direction at the same time, so that the first position limiting part 12 and the second position limiting part 13 may be close to or away from each other, thereby adjusting the first dimension of the spacing between the first position limiting part 12 and the second position limiting part 13. Alternatively, the adjusting mechanism 20 is configured to drive the second position limiting part 13 to move along the first direction, so that the second position limiting part 13 moves close to or away from the first position limiting part 12.

It should be noted that, the flexible display module 200 has a second dimension along the first direction. By adjusting the first dimension, a difference between the second dimension of the flexible display module 200 and the first dimension may be determined, thus, determining a fold rate of the flexible display module 200 according to a ratio of the difference to the second dimension of the flexible display module 200. It should be noted that, because folds need to be formed, the second dimension of the flexible display module 200 along the first direction should be larger than the first dimension.

Figure 3:
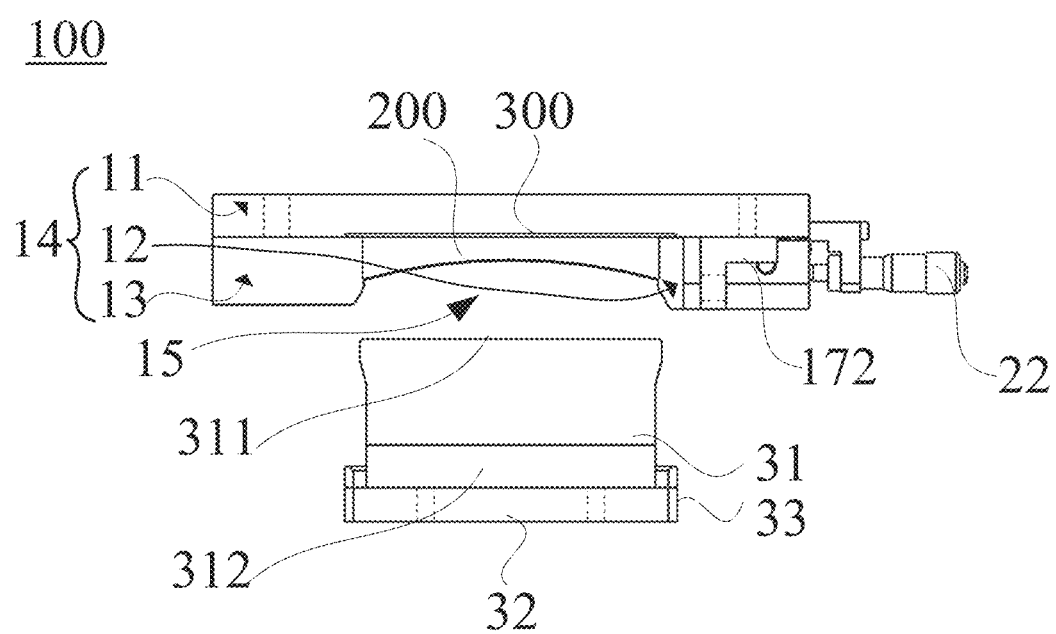
FIG. 3 is a schematic structural view showing the fold testing device in FIG. 1 from yet another angle.

Referring to FIG. 3, the attaching mechanism 30 includes an elastic attaching body 31. The elastic attaching body 31 is movable toward the supporting body 11 along a second direction, and the elastic attaching body 31 engages with the positioning part 14. The supporting body 11, the first position limiting part 12, the second position limiting part 13, and the elastic attaching body 31 define a limiting position, and the flexible display module 200 forms folds with a fold rate at the limiting position. A first direction is defined as a direction of a straight line connected between a first center of the first position limiting part and a second center of the second position limiting part, and the second direction is perpendicular to a horizontal plane where the first direction is located.

At a side of the first position limiting part 12 and second position limiting part 13, which are away from the supporting body 11, an opening 15 is formed between the first position limiting part 12 and the second position limiting part 13, and the opening 15 communicates with the positioning part 14, and the elastic attaching body 31 may move from the opening into the positioning part 14 via the opening 15 along the second direction.

A projection of the elastic attaching body 31 on the supporting body 11 along the second direction covers a region of the supporting body 11 between the first position limiting part 12 and the second position limiting part 13. Specifically, the elastic attaching body 31 includes an attaching part 311 and a connecting part 312. The attaching part 311 is arranged closer to the supporting body 11 than the connecting part 312 does along the second direction, and the projection of the attaching part 311 on the supporting body 11 along the second direction covers the region of the supporting body 11 between the first position limiting part 12 and the second position limiting part 13. In this way, after the attaching part 311 enters the positioning part 14, the attaching part 311 of the elastic attaching body 31 is squeezed and deformed to exert a reliable pressure on the flexible display module 200, thereby ensuring folds to be formed on the flexible display module 200 reliably.

In this embodiment, the material of the elastic attaching body 31 may be silica gel, so that the elastic attaching body 31 itself have a certain strength, and may maintain a shape in a natural state, and moreover, may generate a certain deformation while being squeezed, thereby exerting a pressure on the flexible display module 200. It should be noted that the material of the elastic attaching body 31 of the present application is not limited to silica gel, and may also be other suitable elastic materials.

Therefore, the flexible display modules 200 with different fold rates may be formed by adjusting the first dimension of the spacing between the first position limiting part 12 and the second position limiting part 13 via the adjusting mechanism 20, and by the engagement of the positioning part 14 with the elastic attaching body 31. In this way, the display effect of the flexible display modules 200 with different fold rates and the screen reliability may be tested according to subsequent experiments.

Figure 4:
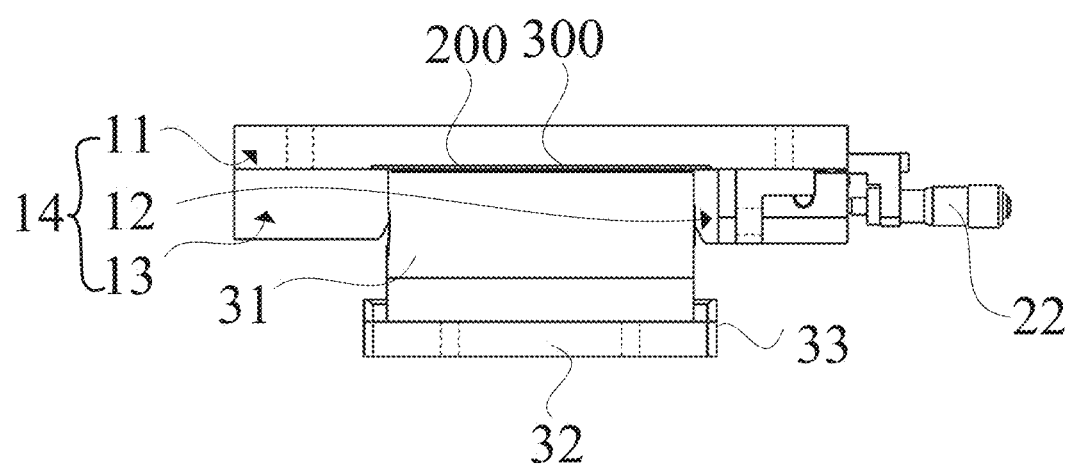
FIG. 4 is a schematic structural view showing the fold testing device in FIG. 1 after a support mechanism engages with an attaching mechanism.

Referring to FIGS. 3 and 4, before the elastic attaching body 31 engages with the positioning part 14, a cover plate 300 is arranged between the first position limiting part 12 and the second position limiting part 13, and the cover plate 300 is attached to the supporting body 11. In this case, the flexible display module 200 is attached to the cover plate 300 correspondingly, so that the folds of the flexible display module 200 may be shaped, thus making it convenient to perform subsequent tests. Specifically, two sides of the cover plate 300 along the first direction are clamped between the supporting body 11 and the first position limiting part 12, and between the supporting body 11 and the second position limiting part 13, respectively. In this case, when the elastic attaching body 31 engages with the positioning part 14, the flexible display module 200 is attached to the cover plate 300, thereby obtaining the screen with a fold rate. Specifically, the cover plate 300 is a flat plate. The supporting body 11 is in the shape of a plate, and the first position limiting part 12 and the second position limiting part 13 are in the shapes of long strips.

The adjusting mechanism 20 includes at least one first moving mechanism 21, configured to drive one of the first position limiting part 12 and the second position limiting part 13 to move close to or away from another of the first position limiting part 12 and the second position limiting part 13 along the first direction.

In this embodiment, the adjusting mechanism 20 includes the first moving mechanism 21. The first moving mechanism 21 is configured to drive the first position limiting part 12 to move, so that the first position limiting part 12 moves close to or away from the second position limiting part 13 along the first direction. In other embodiments, the adjusting mechanism 20 includes the first moving mechanism 21. The first moving mechanism 21 is configured to drive the second position limiting part 13 to move, so that the second position limiting part 13 moves close to or away from the first position limiting part 12 along the first direction.

That is to say, one of the first position limiting part 12 and the second position limiting part 13 is fixed on the supporting body 11, and the other may be driven by the first moving mechanism 21 to move, such that the operation is relatively simple.

In other embodiments, the adjusting mechanism 20 includes two first moving mechanisms 21. One first moving mechanism 21 is configured to drive the first position limiting part 12 to move, so that the first position limiting part 12 moves close to or away from the second position limiting part 13 along the first direction. The other first moving mechanism 21 is configured to drive the second position limiting part 13 to move, so that the second position limiting part 13 moves close to or away from the first position limiting part 12 along the first direction. The first position limiting part 12 and the second position limiting part 13 are driven to move by the two first moving mechanisms 21 respectively, thereby avoiding the problem that the flexible display module 200 cannot be centered due to unilateral adjustment.

Further, the adjusting mechanism 20 further includes at least one adjusting knob 22. The adjusting knob 22 is connected to the first moving mechanism 21 corresponding to the adjusting knob, and is operatively rotatable to adjust the amount of movement of the first moving mechanism 21. The amount of movement of the first moving mechanism 21 may be manually adjusted by the adjusting knob 22, so as to make the adjustment of the amount of movement of the first moving mechanism 21 more convenient. In other embodiments, an automatic adjustment mode may also be used, and will not be described herein in detail.

Referring to FIG. 2 again, in this embodiment, the supporting body 11 comprises a scale portion (not shown), and the scale portion extends along the first direction to display a value of the first dimension of the spacing between the first position limiting part 12 and the second position limiting part 13. In this way, when the adjusting mechanism 20 adjusts the first dimension of the spacing between the first position limiting part 12 and the second position limiting part 13, the corresponding value of the first dimension may be read by means of the scale portion, thus speeding up the adjustment efficiency. It should be noted that the scale portion may be arranged at an edge of the supporting body 11, so as to avoid affecting the attaching process of the flexible display module 200.

Referring to FIG. 1 again, in this embodiment, each of the first position limiting part 12 and the second position limiting part 13 is provided with a pre-bending groove 16 communicating with the positioning part 14. Each pre-bending groove 16 extends along the third direction, and two sides of the flexible display module 200 along the first direction engage with two pre-bending grooves 16 of the first position limiting part 12 and the second position limiting part 13, respectively. Any two of the first direction, the second direction, and the third direction are perpendicular to each other. By providing the pre-bending grooves 16, the flexible display module 200 may be pre-bent and arranged in the positioning part 14 before the elastic attaching body 31 engages with the positioning part 14, which can simplify the operation and improve the efficiency.

Specifically, the two pre-bending grooves 16 are respectively arranged on two surfaces of the first position limiting part 12 and the second position limiting part 13 away from the supporting body 11, so that, after the flexible display module 200 engages with the pre-bending grooves 16, the flexible display module 200 is not in contact with the cover plate 300, thereby protecting the flexible display module 200 from being damaged or deformed due to force.

In the present embodiment, one pre-bending groove 16 passes through the first position limiting part 12 along the third direction, and two first inserting openings are respectively formed on two end surfaces of the first position limiting part 12 along the third direction and communicate with the corresponding pre-bending groove 16 of the second position limiting part 13. The other pre-bending groove 16 passes through the second position limiting part 13 along the third direction, such that second inserting openings are formed on two end surfaces of the second position limiting part 13 along the third direction and communicates with the other corresponding pre-bending groove 16. The two sides of the flexible display module 200 are respectively inserted into the corresponding pre-bending grooves 16 corresponding to the first inserting opening and the pre-bending groove 16 corresponding to the second inserting opening by means of the first inserting opening and the second inserting opening along the third direction, and the two sides of the flexible display module engage with the corresponding pre-bending groove 16 corresponding to the first inserting opening and the pre-bending groove 16 corresponding to the second inserting opening, thus simplifying the steps of the flexible display module 200 engaging with the pre-bending groove 16.

The support mechanism 10 further includes at least one auxiliary position limiting assembly 17. The at least one auxiliary position limiting assembly 17 is arranged on the supporting body 11. The auxiliary position limiting assembly 17 includes an auxiliary position limiting member 171 capable of operationally moving close to the first position limiting part 12 in the first direction, so as to abut against a side of the first position limiting part 12 away from the second position limiting part 13. Or the auxiliary position limiting member 171 is capable of operationally moving close to the second position limiting part 13 in the first direction, so as to abut against a side of the second position limiting part 13 away from the first position limiting part 12. In this way, when the elastic attaching body 31 engages with the positioning part 14, due to the deformation of the elastic attaching body 31, a squeezing force will be generated, thus causing the first position limiting part 12 and the second position limiting part 13 to tend to move away from each other. By arranging the auxiliary position limiting member 171, the first position limiting part 12 and the second position limiting part 13 may be kept at a limited position, thereby ensuring the folds of the flexible display module 200 to be shaped stably.

Specifically, the auxiliary position limiting member 171 is an adjusting nut. The auxiliary position limiting assembly 17 further includes a fixing member 172, which is fixed on the supporting body 11. The fixing member 172 has a threaded hole extending along the first direction and engaging with the auxiliary position limiting member 171. In this way, one end of the auxiliary position limiting member 171 toward the first position limiting part 12 or towards the second position limiting part 13 may be adjusted to abut against the first position limiting part 12 or the second position limiting part 13 by rotating the auxiliary position limiting member 171 easily.

Further, the auxiliary position limiting assembly 17 may be disposed on the first position limiting part 12 and/or the second position limiting part 13, which may be driven by the first moving mechanism 21 to move.

Referring to FIG. 2 again, in this embodiment, the attaching mechanism 30 further includes the second moving mechanism 32. The second moving mechanism 32 is configured to support on the side of the elastic attaching body 31 away from the support mechanism 10 along the second direction. The second moving mechanism 32 is configured to drive the elastic attaching body 31 to move towards the supporting body 11 along the second direction. By arranging the second moving mechanism 32, the movement of the elastic attaching body 31 towards the supporting body 11 may be more stable and precise.

The attaching mechanism 30 further includes at least two clamping members 33 oppositely arranged along the first direction or along the third direction. The at least two clamping members 33 engage with two sides of the elastic attaching body 31, and the elastic attaching body 31 is detachably mounted on the second moving mechanism 32 by the at least two clamping members 33. Since the elastic attaching body 31 is elastic, after the elastic attaching body 31 engages with the positioning part 14 to enable the flexible display module 200 with a fold rate to be formed, the elastic attaching body 31 cannot automatically break away from the positioning part 14 together with the movement of the second moving mechanism 32. By arranging the clamping members 33 clamped on opposite sides of the elastic attaching body 31, the elastic attaching body 31 may break away from the positioning part 14 together with the movement of the second moving mechanism 32.

Further, when the at least two clamping members 33 are oppositely arranged along the first direction, the at least two clamping members 33 move relative to the second moving mechanism 32 along the third direction, so as to be detachably mounted on the second moving mechanism 32. During a movement, the at least two of the clamping members 33 each have a clamping position for clamping the elastic attaching body 31 and a releasing position for releasing the elastic attaching body 31. When the at least two clamping members 33 are oppositely arranged in the third direction, the at least two clamping members 33 move relative to the second moving mechanism 32 in the first direction, so as to be detachably mounted on the second moving mechanism 32. During a movement, the at least two clamping members 33 include a clamping position for clamping the elastic attaching body 31 and a releasing position for releasing the elastic attaching body 31. In this way, the elastic attaching body 31 may be assembled or disassembled relative to the second moving mechanism 32 conveniently.

Further, when the at least two clamping members 33 are in the clamping position, the at least two clamping members 33 are mounted on the second moving mechanism 32. When the at least two clamping members 33 are in the releasing position, the at least two clamping members 33 may be disassembled from the second moving mechanism 32.

Specifically, when the at least two clamping members 33 are oppositely arranged in the first direction, one of the clamping member 33 and the second moving mechanism 32 has a guiding groove extending in the third direction, another of the clamping member 33 and the second moving mechanism 32 has a guiding protrusion that engages with the guiding groove. When the at least two clamping members 33 are in the clamping position, the guiding groove and the guiding protrusion engage with each other.

Specifically, when at least two clamping members 33 are oppositely arranged in the third direction, one of the clamping member 33 and the second moving mechanism 32 has a guiding groove extending in the first direction, another of the clamping member 33 and the second moving mechanism 32 has a guiding protrusion that engages with the guiding groove. When the at least two clamping members 33 are in the clamping position, the guiding groove and the guiding protrusion engage with each other. By means of the simple arrangement of the guiding groove with the guiding protrusion, the disassembly and assembly process of the clamping member 33 is simplified.

Based on the same inventive concept, the present application also provides a fold testing method, including the following steps.

At step S110, a flexible display module 200 is placed in a positioning part 14 constructed by a supporting body 11, a first position limiting part 12, and a second position limiting part 13. The first position limiting part 12 and the second position limiting part 13 are oppositely arranged on the same side surface of the supporting body 11 along a first direction. The supporting body 11, the first position limiting part 12, and the second position limiting part 13 are enclosed to form the positioning part 14. The flexible display module 200 is received in the positioning part 14, and there is a first dimension of a spacing between the first position limiting part 12 and the second position limiting part 13 along the first direction.

At step S120, an elastic attaching body 31 is moved towards the supporting body 11 along a second direction, and the elastic attaching body 31 engages with the positioning part 14, and the supporting body 11, the first position limiting part 12, the second position limiting part 13 and the elastic attaching body 31 define a limiting position, folds of the flexible display module 200 with a fold rate are formed at the limiting position, and the second direction is perpendicular to the first direction.

Specifically, the first direction is the direction where the first position limiting part 12 and the second position limiting part 13 are located, and the second direction is the direction perpendicular to the supporting body 11.

Specifically, at step S110, the first dimension of the spacing between the first position limiting part 12 and the second position limiting part 13 is adjusted by the adjusting mechanism 20, that is, the adjusting mechanism 20 drives the first position limiting part 12 and/or the second position limiting part 13 to move in the first direction, so that the first position limiting part 12 and the second position limiting part 13 are close to or away from each other.

Specifically, at step S110, each of the first position limiting part 12 and the second position limiting part 13 is provided with a pre-bending groove 16 communicating with the positioning part 14. The pre-bending groove 16 extends along the third direction, and two sides of the flexible display module 200 along the first direction engage with two pre-bending grooves 16 of the first position limiting part and the second position limiting part, respectively. The first direction is perpendicular to the third direction.

Specifically, at step S120, a projection of the elastic attaching body 31 on the supporting body 11 along the second direction covers a region of the supporting body 11 between the first position limiting part 12 and the second position limiting part 13.

Specifically, at step S120, the second moving mechanism 32 drives the elastic attaching body 31 to move towards the supporting body 11 along the second direction.

In an embodiment of the present application, before the step S110, the following steps are further included.

At step S100, a cover plate 300 is placed between the first position limiting part 12 and the second position limiting part 13, and attached to the supporting body 11.

Specifically, at step S100, two sides of the cover plate 300 along the first direction are clamped between the supporting body 11 and the first position limiting part 12, and between the supporting body 11 and the second position limiting part 13, respectively.

In the fold testing device and the fold testing method of the present application, the first dimension of the spacing between the first position limiting part 12 and the second position limiting part 13 is adjusted by the adjusting mechanism 20, and the flexible display modules 200 with different fold rates may be formed by means of the engagement of the positioning part 14 with the elastic attaching body 31. In this way, the display effect of the flexible display modules 200 with different fold rates and the screen reliability may be tested according to subsequent experiments.

The above descriptions are some embodiments of the present application, but are not intended to limit the present application. Various modifications and equivalent replacements, etc. made within the spirit and principles of the present application should be within the protection scope of the present application.

What is claimed is:

1. A fold testing device, comprising:
a support mechanism, comprising a supporting body, a first position limiting part, and a second position limiting part; the first position limiting part and the second position limiting part being oppositely arranged on a side of the supporting body along a first direction; the supporting body, the first position limiting part and the second position limiting part being enclosed to form a positioning part; and a flexible display module being received in the positioning part;
an adjusting mechanism, installed on the supporting body, the adjusting mechanism being configured to drive at least one of the first position limiting part and the second position limiting part to move along the first direction to make the first position limiting part and the second position limiting part close to or away from each other, to adjust a first dimension of a spacing between the first position limiting part and the second position limiting part; and
an attaching mechanism, comprising an elastic attaching body; the elastic attaching body being movable toward the supporting body along a second direction; the elastic attaching body engaging with the positioning part; the supporting body, the first position limiting part, the second position limiting part and the elastic attaching body defining a limiting position; and the flexible display module forming folds with a fold ratio at the limiting position, wherein the flexible display module has a second dimension along the first direction, and the fold ratio is determined according to a ratio of a difference between the second dimension and the first dimension to the second dimension;
each of the first position limiting part and the second position limiting part is provided with a pre-bending groove connected to the positioning part;
each pre-bending groove extends along a third direction, and two sides of the flexible display module along the first direction engage with the pre-bending groove of the first position limiting part and the pre-bending groove of the second position limiting part, respectively; and
any two of the first direction, the second direction, and the third direction are perpendicular to each other.

2. The fold testing device according to claim 1, wherein:
an opening is formed between the first position limiting part and the second position limiting part at a side of the first position limiting part and the second position limiting part away from the supporting body;
wherein the opening communicates with the positioning part; and
wherein the elastic attaching body is configured to move from the opening into the positioning part via the opening along the second direction.

3. The fold testing device according to claim 1, wherein a projection of the elastic attaching body on the supporting body along the second direction covers a region of the supporting body between the first position limiting part and the second position limiting part.

4. The fold testing device according to claim 1, wherein:
the adjusting mechanism comprises at least one first moving mechanism; and
wherein the at least one first moving mechanism is configured to drive one of the first position limiting part and the second position limiting part to move close to or away from another of the first position limiting part and the second position limiting part along the first direction.

5. The fold testing device according to claim 4, wherein:
a quantity of the at least one first moving mechanism is two;
wherein one of the two first moving mechanisms is configured to drive the first position limiting part to move close to or away from the second position limiting part along the first direction; and
wherein another of the two first moving mechanisms is configured to drive the second position limiting part to move close to or away from the first position limiting part along the first direction.

6. The fold testing device according to claim 4, wherein:
the adjusting mechanism further comprises at least one adjusting knob; and
wherein the adjusting knob is connected to the first moving mechanism corresponding to the adjusting knob, and the adjusting knob is operatively to adjust an amount of movement of the first moving mechanism.

7. The fold testing device according to claim 1, wherein:
the pre-bending groove disposed in the first position limiting part passes through the first position limiting part along the third direction, and two first inserting openings are respectively formed on two end surfaces of the first position limiting part along the third direction and communicate with the pre-bending groove of the first position limiting part;
wherein the pre-bending groove disposed in the second position limiting part passes through the second position limiting part along the third direction, and two second inserting openings are respectively formed on two end surfaces of the second position limiting part along the third direction and communicate with the pre-bending groove of the second position limiting part; and
wherein the two sides of the flexible display module are respectively inserted into the pre-bending groove corresponding to the first inserting opening and the pre-bending groove corresponding to the second inserting opening via the first inserting opening and the second inserting opening along the third direction, and the two sides of the flexible display module engage with the pre-bending groove corresponding to the first inserting opening and the pre-bending groove corresponding to the second inserting opening respectively.

8. The fold testing device of claim 1, wherein the two pre-bending grooves are respectively disposed on two surfaces of the first position limiting part and the second position limiting part away from the supporting body.

9. The fold testing device according to claim 1, wherein:
the support mechanism further comprises at least one auxiliary position limiting assembly;
wherein the at least one auxiliary position limiting assembly is arranged on the supporting body; and
wherein the auxiliary position limiting assembly comprises an auxiliary position limiting member capable of operationally moving close to the first position limiting part along the first direction, the auxiliary position limiting member is configured to abut against a side of the first position limiting part away from the second position limiting part.

10. The fold testing device according to claim 9, wherein: the auxiliary position limiting member is an adjusting nut; and wherein the auxiliary position limiting assembly further comprises a fixing member, and the fixing member is fixed to the supporting body, and the fixing member is provided with a threaded hole extending along the first direction and engaging with the adjusting nut.

11. The fold testing device according to claim 1, wherein the support mechanism further comprises at least one auxiliary position limiting assembly;

wherein the at least one auxiliary position limiting assembly is arranged on the supporting body; and wherein the auxiliary position limiting assembly comprises an auxiliary position limiting member capable of operationally moving close to the second position limiting part along the first direction, the auxiliary position limiting member is configured to abut against a side of the second position limiting part away from the first position limiting part.

12. The fold testing device according to claim 1, wherein: the attaching mechanism further comprises a moving mechanism; and wherein the moving mechanism is configured to support on a side of the elastic attaching body away from the support mechanism along the second direction, and the moving mechanism is configured to drive the elastic attaching body to move towards the supporting body along the second direction.

13. The fold testing device according to claim 12, wherein:

the attaching mechanism further comprises at least two clamping members oppositely arranged;

wherein the at least two clamping members engage with two sides of the elastic attaching body; and wherein the elastic attaching body is detachably mounted on the moving mechanism by the at least two clamping members.

14. The fold testing device according to claim 13, wherein:

the at least two clamping members are oppositely arranged along the first direction;

wherein the at least two clamping members are configured to move relative to the moving mechanism along a third direction;

wherein the at least two clamping members comprise a clamping position for clamping the elastic attaching body and a releasing position for releasing the elastic attaching body during a movement; and wherein the third direction is perpendicular to the first direction.

15. The fold testing device according to claim 13, wherein:

the at least two clamping members are oppositely arranged in a third direction;

wherein the at least two clamping members are configured to move relative to the moving mechanism in the first direction;

wherein the at least two clamping members comprise a clamping position for clamping the elastic attaching body and a releasing position for releasing the elastic attaching body during a movement; and wherein the third direction is perpendicular to the first direction.

16. The fold testing device according to claim 1, wherein a cover plate is arranged between the first position limiting part and the second position limiting part, and the cover plate is attached to the supporting body.

17. The fold testing device according to claim 16, wherein two sides of the cover plate along the first direction are clamped between the supporting body and the first position limiting part, and between the supporting body and the second position limiting part, respectively.

* * * * *